United States Patent Office 3,709,727

Patented Jan. 9, 1973

3,709,727

METALIZING SUBSTRATES

George T. Miller, Lewiston, N.Y., assignor to Hooker Chemical Corporation, Niagara Falls, N.Y.

No Drawing. Continuation-in-part of abandoned application Ser. No. 785,796, Dec. 20, 1968. This application Apr. 30, 1971, Ser. No. 139,253

Int. Cl. B44d 1/20; C23c 3/02

U.S. Cl. 117—213 16 Claims

ABSTRACT OF THE DISCLOSURE

An improvement in the conductivity of substrates, particularly thermoplastic resins and polymers, which are plated with metals by pre-treatment of the substrate with phosphorus and/or low oxidation state phosphorus compounds usually in an organic solvent to deposit phosphorus and/or phosphorus compounds at the surface, followed by contacting the treated substrate with a metal salt or complex thereof, is produced by the addition of cesium to the metal salt or complex thereof. The resulting treated substrate can be readily chemically plated and/or electroplated by conventional techniques.

This is a continuation-in-part of my copending application Ser. No. 785,796, filed Dec. 20, 1968, now abandoned.

BACKGROUND OF THE INVENTION

There is a rapidly increasing demand for metal plated articles, for example, in the production of low cost plastic articles that have a simulated metal appearance. Such articles are in demand in such industries as automotive, home applicance, radio and television and for use in decorative containers and the like. Heretofore, the metal plating of plastics and the like has required many process steps, and generally such processes have been applicable to only one or a few related substrates.

It is an object of this invention to provide a simple and improved process for the metal plating of substrates. Another object of the invention is to provide a process that is applicable to the plating of many different substrates particularly thermoplastic polymers. A further object of the invention is to provide articles having an adherent metal coating that is resistant to peeling, temperature cycling, and corrosion. An additional object of the invention is to provide substrates having an improved conductivity so that they may be electroplated readily by conventional techniques. Such coatings are electrically conductive whereby static charges are readily dissipated from the surfaces. The metal coatings further serve to protect the articles from abrasion, scratching and marring, reduce their porosity and improve their thermal conductivity. The process of this invention can be used for unidirectional mirrors and the like; water and liquid collecting devices and the like; protective coatings on houses, cars, boats, power line poles, street lights and the like; in thermal control of clothing, houses and the like; and the like.

SUMMARY OF THE INVENTION

This invention provides an improved process for the metal coating of substrates. More particularly, this invention relates to a process which comprises contacting a substrate with phosphorus and/or low oxidation state phosphorus compounds so as to deposit phosphorus and/or phosphorus compounds at the surface, and thereafter contacting the thus-treated substrate with a solution of a metal salt or complex thereof in the presence of cesium.

DESCRIPTION OF THE PREFERRED EMBODIMENT

An article having a metal phosphide adherently formed at the surface of the substrate can be provided in accordance with the process of my application S.N. 683,793, filed Nov. 17, 1967, now abandoned, and copending application S.N. 750,477, filed Aug. 6, 1968, now abandoned.

The process of this invention is applicable to substrates, such as plastics and to other substantially non-metallic substrates. Suitable substrates in addition to plastics include, but are not limited to, cellulosic and ceramic materials such as cloth, paper, woods, cork, cardboard, clay, porcelain, leather, porous glass, asbestos, cement, and the like.

Typical plastics to which the process of this invention is applicable include the homopolymers and copolymers of ethylenically unsaturated aliphatic, alicyclic and aromatic hydrocarbons such as polyethylene, polypropylene, polybutene, ethylenepropylene copolymers; copolymers of ethylene or propylene or with other olefins, polybutadiene; polymers of butadiene, polyisoprene, both natural and synthetic, polystyrene including high impact polystyrene, and polymers of pentene, hexene, heptene, octene, 2-methylpropene, 4-methyl-hexene-1, bicyclo-(2.2.1)-2-heptene, pentadiene, hexadiene, 2,3-dimethylbutadiene-1,3,4-vinylcyclohexene, cyclopentadiene, methylstyrene, and the like. Other polymers useful in the invention include polyhalogenated hydrocarbon polymers, including fluoro polymers such as polytetrafluoroethylene; polysilicone and polyhalogenated silicones; polyindene, indenecoumarone resins; polymers or acrylate esters and polymers of methacrylate esters, acrylate and methacrylate resins such as ethyl acrylate, n-butyl methacrylate, isobutyl methacrylate, ethyl methacrylate and methyl methacrylate; alkyl resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins, furan resins (furfuryl alcohol or furfuralketone); hydrocarbon resins from petroleum; isobutylene resins (polyisobutylene); isocyanate resins (polyurethanes); melamine resins such as melamine-formaldehyde and melamine-urea-formaldehyde; oleo resins; phenolic resins such as phenol-formaldehyde, phenolic-elastomer, phenolic epoxy, phenolic-polyamide, and phenolic-vinyl acetals; polyamide polymers, such as polyamides, polyamide-epoxy and particularly long chain synthetic polymeric amides containing recurring carbonamide groups as an integral part of the main polymers chain; polyacrylamides; polysulfones; polyester resins such as unsaturated polyesters of dibasic acids and dihydroxy compounds, and polyester elastomers and resorcinol resins such as resorcinol-formaldehyde, resorcinol-furfural, resorcinol-phenol-formaldehyde, resorcinol-polyamide and resorcinol-urea; rubbers such as natural rubber, synthetic polyisoprene, reclaimed rubber, chlorinated rubber, polybutadiene, cyclized rubber, butadiene-acrylonitrile rubber, butadiene-styrene rubber, and butyl rubber, neoprene rubber (polychloroprene); polysulfides (Thiokol); terpene resins, urea resins; vinyl resins such as polymers of vinyl acetal, vinyl acetate or vinyl alcohol-acetate copolymers, vinyl alcohol, vinyl chloride, vinyl butyral, vinyl chloride-acetate copolymer, vinyl pyrrolidone and vinylidene chloride copolymer; polyformaldehyde; polyethers, such as polyphenylene oxide, polymers of diallyl phthalates and phthalates; polycarbonates of phosgene or thiophosgene and dihydroxy compounds such as bisphenols, thermoplastic polymers of bisphenols and epichlorohydrin (tradename Phenoxy polymers); graft copolymers and polymers of unsaturated hydrocarbons and an unsaturated monomer such as graft copolymers of polybutadiene, styrene and acrylonitrile, commonly called ABS resins; ABS-polyvinyl chloride polymers; acrylic polyvinyl chloride polymers; and any other suitable natural and synthetic polymers.

The polymers can be used in the unfilled condition, or with fillers such as glass fiber, glass powder, glass beads, asbestos, talc and other mineral fillers, wood flour and other vegetable fillers, carbon in its various forms, dyes, pigments, waxes and the like.

The substrates can be in various physical forms such as shaped articles, for example, moldings, sheets, rods, and the like; fibers, films, and fabrics, and the like and of various thickness.

In the first step of the preferred process of S.N. 683,793, the substrate is subjected to elemental white phosphorus, which includes the various impure or commercial grades sometimes referred to as yellow phosphorus. In the first step of the process of S.N. 750,477, the substrate is subjected to at least one low oxidation state phosphorus compound, usually in a solvent. The low oxidation state phosphorus compound, wherein the phosphorus has an oxidation state of less than 5, i.e., an oxidation number of $-3$ to $+3$, can be prepared by reacting elemental phosphorus, preferably elemental white phosphorus (which includes various impure or commercial grades sometimes referred to as yellow phosphorus), with a suitable nucleophilic reagent or organometallic compound (including Grignard reagents). The phosphorus can be utilized in the vapor phase, as a liquid or dissolved in a solvent. Suitable solvents or diluents for the phosphorus are solvents that dissolve phosphorus and which preferably swell the surface of a plastic without detrimentally affecting the surface of the plastic.

When a solution of phosphorus and/or low oxidation state phosphorus compound is employed in the process, the solution concentration is generally in the range from about 0.0001 weight percent of phosphorus based on the weight of the solution up to a saturated solution and preferably from about 1.5 to about 2.5 percent. Prior to subjecting the substrate to the elemental or low oxidation state phosphorus, in gaseous, liquid or solution, the surface of the article should be clean. When a solution is used, the solvent generally serves to clean the surface. A solvent wash may be desirable when gaseous or liquid phosphorus is employed. However, it is not necessary to subject the substrate to special treatment such as etching, polishing and the like. The phosphorus treatment is generally conducted at a temperature below the softening point of the substrate, and below the boiling point of the solvent, if a solvent is used. Generally, the temperature is in the range of about 10 to about 135 degrees centigrade, but preferably in the range of about 10 to about 100 degrees centigrade. The contact time varies depending on the nature of the substrate, the solvent and temperature, but is generally in the range of about one second to one hour or more, preferably in the range of about one to ten minutes.

As a result of the first treatment step, the phosphorus and/or phosphorus compound is deposited or nucleated at the surface of the substrate. By this is meant that the phosphorus can be located on the surface, embedded in the surface and embedded beneath the surface of the substrate. The location of the phosphorus is somewhat dependent on the action of the solvent and reaction conditions on the surface.

Following the first treatment step, the substrate can be subjected to water and/or aqueous solution of a surfactant, as disclosed in application S.N. 671,337, filed Sept. 28, 1967, now abandoned, and then can be dried by merely exposing the substrate to the atmosphere or to inert atmospheres such as nitrogen, carbon dioxide, and the like, or by drying the surface with radiant heaters or in a conventional oven. Drying times can vary considerably, for example, from one second to 30 minutes or more, preferably 5 seconds to 10 minutes, more preferably 5 seconds to 20 seconds. The rinsing and drying steps are optional.

In the second treatment step of the process, the phosphorus-treated substrate is subjected to a bath containing a solution of a metal salt or a complex of a metal salt, which is capable of reacting with the phosphorus to form a metal phosphide. The term metal phosphide, as used herein, means the metal-phosphorus coating which is formed at the surface of the substrate. Without being limited to theory, the metal phosphide may be an ionic compound or a solution (alloy). The metals generally employed are those of Groups I–B, II–B, IV–B, V–B, VI–B, VII–B and VIII of the Periodic Table appearing on pages 60–61 of Lange's Handbook of Chemistry (Revised Tenth Edition). The preferred metals are copper, silver, gold, chromium, cobalt, nickel, palladium, and the like. Some useful metal salts include copper sulfate, copper chloride, silver nitrate, nickel cyanide and nickel chloride.

The metal salts can be complexed with a complexing agent that produces a solution having a basic pH ($>7$). Particularly useful are the ammoniacal complexes of the metal salts, in which one to six ammonia molecules are complexed with the foregoing metal salts. Typical examples include $NiSO_4 \cdot 6NH_3$, $NiCl_2 \cdot 6NH_3$, and the like. Other useful complexing agents include quinoline, amines and pyridine. Useful complexes include compounds of the formula $MX_2O_2$ ,wherein M is the metal ion, X is chlorine or bromine and Q is quinoline. Typical examples include: $CoCl_2Q_2$, $CoBr_2Q_2$, $NiCl_2O_2$. Also useful are the corresponding monoquinoline complexes such as $CoCl_2Q$. Useful amine complexes include the mono-(ethylenediamine)-bis - (ethylenediamine)-, tris - (ethylenediamine)-, complexes of salts such as copper sulfate. Typical pyridine complexes include $NiCl_2(py)_2$ and $CuCl_2(py)_2$ where py is pyridine.

The foregoing metal salts and their complexes are used in ionic media, preferably in aqueous solutions. However, non-aqueous media can be employed such as alcohols, for example, methyl alcohol, ethyl alcohol and the like; cyclic ethers, for example, tetrahydrofuran, dioxane, and the like. Mixtures of alcohol and water can be used. Also useful are ionic mixtures of alcohol with other miscible solvents. The solution concentration is generally in the range from about 0.1 weight percent metal salt or complex based on the total weight of the solution up to a saturated solution, preferably from about one to about ten weight percent metal salt or complex. The pH of the metal salt or complex solution can range from about 4 to 14 but is generally maintained in the basic range, i.e., greater than 7.0, and preferably from about 10 to about 13.

The conductivity of the resulting metal phosphide is improved by the addition of cesium to the metal salt solution. The cesium can be provided as such as or its salt or complexes thereof which can contain any anion which will not detrimentally affect the metal salt bath. Suitable cesium salts include cesium acetate, cesium aluminum sulfate, cesium bromide, cesium carbonate, cesium chlorate, cesium chloride, cesium chromate, cesium fluoride, cesium monoiodide, cesium nitrate, cesium sulfate, cesium sulfide, cesium ammonium bromide, cesium rubidium chloride and the like. The preferred cesium salt is cesium chloride. The solution concentration is generally in the range of about 0.0001 weight percent cesium salt based on the total weight of the solution to about 20 weight percent, preferably about 0.001 to about 10 weight percent cesium salt.

The step of subjecting the phosphorus treated substrate to the solution of metal salt and cesium is generally conducted at a temperature below the softening point of the substrate, and below the boiling point of the solvent, if one is used. Generally, the temperature is in the range of about 10 to 110 degrees centigrade, preferably from about 20 to 100 degrees centigrade. The time of contact can vary considerably, depending on the nature of the substrate, the characteristics of the metal salt employed, the cesium salt and the contact temperature. However, the time of contact is generally in the range of about 0.1 to 30 minutes, preferably about 5 to 10 minutes.

The treated substrates that result from contacting the substrate with the metal salt solution in the presence of cesium can, if desired, be subjected to a process that has become known in the art as electroless plating or chemical plating. However, because the process of this invention results in the increased electrical conductivity of the metal phosphide, electroless plating is not generally necessary, i.e., the necessity of maintaining the sensitive electroless plating bath is generally avoided.

The treated substrates of the invention can be electroplated by processes known in the art. The article is generally used as a cathode. The metal desired to be plated is generally dissolved in aqueous plating bath, although other media can be employed. Generally, a soluble metal anode of the metal to be plated can be employed. In some instances, however, a carbon anode or other inert anode is used. Suitable metals, solutions and conditions for electroplating are described in Metal Finishing Guidebook Directory for 1967, published by Metals and Plastics Publications, Inc., Westwood, N.J.

The following examples serve to illustrate the invention but are not intended to limit it. Unless otherwise specified in this specification and claims, all temperatures are in degrees centigrade and all parts are understood to be expressed in parts by weight.

EXAMPLE 1

Strips of polyethylene were treated with a 2 percent solution of white phosphorus in trichloroethylene at 70 degrees centigrade for 2 minutes, air-dried for 5 minutes and then transferred for 5 minutes to an ammoniacal nickel chloride solution at 55 to 60 degrees centigrade. The polyethylene acquired an adherent, conductive metal phosphide on its surface having a resistance of 1600 to 2600 ohms between point contacts separated by a distance of 1 cm.

EXAMPLE 2

Example 1 was repeated except that 2.5 weight percent of cesium chloride based on the total weight of the solution was added to the ammoniacal nickel chloride solution. The resistance of the resulting adherent, conductive metal phosphide on the polyethylene strips was in the range of 750 to 1500 ohms between point contacts separated by a distance of 1 cm.

EXAMPLE 3

A sample of polyethylene was subjected to a 2 percent solution of phosphorus in trichloroethylene at 70 degrees centigrade for 2 minutes and then air-dried for 5 seconds. The substrate was thereafter subjected to an ammoniacal nickel chloride solution at 70 degrees centigrade for 5 minutes. A second sample of polyethylene was treated in similar fashion except that 1.0 percent cesium chloride based on the total weight of the solution was added to the ammoniacal nickel chloride solution. Comparison of the adherent nickel phosphides of each substrate showed that the substrate treated in the bath containing the cesium had a greater conductivity than the substrate that had been treated in the nickel chloride bath without the cesium.

EXAMPLES 4–6

Linear polyethylene was subjected to a 2 percent solution of phosphorus in trichloroethylene at 60 to 62 degrees for 2 minutes. The resulting substrates were air-dried for 5 seconds and then subjected to a metal salt solution for 10 minutes at room temperature. Three metal salt solutions were employed. The control solution contained 10 percent nickel chloride and 90 percent ammonium hydroxide. The first experimental solution contained the control solution plus 0.01 percent cesium chloride and the second experimental solution contained the control solution plus 0.1 percent cesium chloride. All substrates thus-treated obtained an adherent metal phosphide at their surfaces. The resulting resistance of the conductive metal phosphides in ohms, measured between point contacts separated by a distance of 1 cm., was:

| | Solution | Ohms |
|---|---|---|
| Example number: | | |
| 4 | Control | 150,000 |
| 5 | Control plus 0.01% CsCl | 20,000 |
| 6 | Control plus 0.1% CsCl | 10,000 |

The foregoing examples demonstrate that the addition of cesium to the metal salt solution results in an increased conductivity of the adherent metal phosphide.

EXAMPLES 7–12

The process of Example 2 is repeated but substituting the following substrates for the polyethylene to produce adherent metal phosphides on the surfaces of the substrates.

| Example No.: | Substrate |
|---|---|
| 7 | Polypropylene. |
| 8 | ABS. |
| 9 | Phenol-formaldehyde resin. |
| 10 | Polyvinyl chloride. |
| 11 | Wood. |
| 12 | Porcelain. |

EXAMPLE 13

Strips of polypropylene were treated for 2 minutes at 73° C. with perchloroethylene, air dried for 20 seconds and thereafter treated for 6 minutes at 43° C. in a 1% solution of phosphorous sesquiphosphide in perchloroethylene. The phosphorus sesquiphosphide treated substrate was thereafter air-dried for 3 minutes and then transferred to an ammoniacal copper chloride solution at 66° C. for 10 minutes. The ammoniacal copper chloride solution contained 6 gram $CuCl_2$, 5 cc. ethylene diamine, enough $NH_4OH$ to dissolve the initial precipitant prior to the addition of the ethylene diamine, and water to make a total volume of 60 cc. The polypropylene acquired an adherent, conductive metal phosphide on its surface having a resistance of 175,000 ohms between point contacts separated by a distance of ¼ inch.

EXAMPLE 14

Example 13 was repeated except that 0.56 gram cesium chloride was added to the ammoniacal copper chloride solution. The resistance of the resultant conductive metal phosphite on the polypropylene strip was 15,000 ohms between contact points separated by a distance of ¼ inch.

EXAMPLE 15

Strips of polypropylene were treated for 2 minutes at 65° C. in perchloroethylene air-dried for 30 seconds and thereafter treated for 5 minutes at 40° C., in a 1% solution of phosphorus sesquisulfide in perchloroethylene. The phosphorus sesquisulfide was thereafter air-dried for 3 minutes and then transferred to an ammoniacal nickel solution containing 10 grams of nickel formate, 90 grams of concentrated $NH_4OH$ for 5 minutes at 63° C. The polypropylene acquired an adherent, conductive metal phosphide on its surface having a resistance of 300,000 ohms between point contacts separated by a distance of ¼ inch.

EXAMPLE 16

Example 15 was repeated except that 0.5 gram of cesium chloride was added to the ammoniacal nickel solution. The resistance of the resultant conductive metal phosphide on the polypropylene strip was 50,000 ohms between contact points separated by a distance of ¼ inch.

EXAMPLE 17

The treated polyethylene strips of Example 1 are electroless plated by subjection to the electroless nickel plating step of the MACuplex process of the MacDermid Company. The resulting plastic strips are electroplated using a conventional Watts nickel plating process.

EXAMPLE 18

The treated polyethylene strips of Example 2 are electroplated by employing the plastic strips as the cathode in a nickel chloride plating bath. A current of one ampere is passed through the plating bath for 30 minutes, equivalent to a current density of 50 amperes per square foot, to produce adherent metal coatings on the treated plastic strips.

Various changes and modifications can be made in the products and process of this invention without departing from the spirit and scope of the invention. The various embodiments of the invention disclosed herein serve to further illustrate the invention but are not intended to limit it.

What is claimed is:

1. A process which comprises subjecting a non-metallic substrate to white phosphorus to deposit phosphorus at the surface of the substrate and thereafter subjecting the phosphorus treated substrate to a solution of cesium or a salt thereof and a metal salt or complex thereof which is capable of reacting with the phosphorus to form a metal phosphide, wherein said metal is selected from the group consisting of Groups I–B, II–B, IV–B, V–B, VI–B, VII–B, and VIII of the Periodic Table.

2. The process of claim 1 wherein said cesium salt is cesium chloride.

3. A process wherein the substrate resulting from the process of claim 1 is electroless plated to deposit an electroless conductive coating on the treated substrate.

4. A process wherein the substrate resulting from the process of claim 1 is electroplated to deposit an adherent metal coating on the treated substrate.

5. The process of claim 1 wherein said metal salt complex is an ammoniacal complex of nickel chloride.

6. The process of claim 1 wherein the substrate is a plastic.

7. The process of claim 6 wherein said plastic is polyethylene.

8. A solution which comprises about 0.0001 to about 20 weight percent cesium or a salt thereof and from about 0.1 weight percent to a saturating amount of a metal salt or complex thereof wherein said metal is selected from the group consisting of Groups I–B, II–B, IV–B, V–B, VI–B, VII–B, and VIII of the Periodic Table.

9. The solution of claim 8 wherein said cesium salt is cesium chloride.

10. The solution of claim 9 wherein said metal salt complex is an ammoniacal complex of nickel chloride.

11. A process which comprises subjecting a non-metallic substrate to a low oxidation state phosphorus compound, having an oxidation number of −3 to +3, to deposit phosphorus compound at the surface of the substrate and thereafter subjecting the phosphorus compound treated substrate to a solution of cesium or a salt thereof and a metal salt or complex thereof which is capable of reacting with the phosphorus compound to form a metal phosphide, wherein said metal is selected from the group consisting of Groups I–B, II–B, IV–B, V–B, VI–B, VII–B, and VIII of the Periodic Table.

12. The process of claim 11 wherein said cesium salt is cesium chloride.

13. A process wherein the substrate resulting from the process of claim 11 is electroless plated to deposit an electroless conductive coating on the treated substrate.

14. A process wherein the substrate resulting from the process of claim 11 is electroplated to deposit an adherent metal coating on the treated substrate.

15. The process of claim 11 wherein the substrate is a plastic.

16. The process of claim 15 wherein said plastic is polypropylene.

References Cited

Bayard, James J.: Electrodeposition on Plastic Materials, in Metal Industry, May 1940.

ALFRED L. LEAVITT, Primary Examiner

J. A. BELL, Assistant Examiner

U.S. Cl. X.R.

106—1, 286; 117—47 A, 47 R, 54, 71 R, 138.8 E, 138.8 R, 160 R, 201, 217, 221, 227, 229; 204—30; 252—521